(12) United States Patent
Danieli et al.

(10) Patent No.: US 7,499,861 B2
(45) Date of Patent: Mar. 3, 2009

(54) METHOD FOR MANAGING MIXED INITIATIVE HUMAN-MACHINE DIALOGUES BASED ON INTERACTIVE SPEECH

(75) Inventors: Morena Danieli, Turin (IT); Claudio Rullent, Turin (IT)

(73) Assignee: Loquendo S.p.A., Turin (IT)

( * ) Notice: Subject to any disclaimer, the term of this patent is extended or adjusted under 35 U.S.C. 154(b) by 690 days.

(21) Appl. No.: 10/494,472

(22) PCT Filed: Oct. 25, 2002

(86) PCT No.: PCT/EP02/11959

§ 371 (c)(1),
(2), (4) Date: Apr. 29, 2004

(87) PCT Pub. No.: WO03/038809

PCT Pub. Date: May 8, 2003

(65) Prior Publication Data

US 2005/0010393 A1   Jan. 13, 2005

(30) Foreign Application Priority Data

Oct. 30, 2001   (IT)   ............................ TO2001A1035

(51) Int. Cl.
*G10L 11/00*   (2006.01)
*G10L 21/00*   (2006.01)

(52) U.S. Cl. ...................................... 704/275; 704/270

(58) Field of Classification Search ...................... 704/1, 704/9, 251, 257, E15.04, 270, 275; 379/88.18
See application file for complete search history.

(56) References Cited

U.S. PATENT DOCUMENTS 6,044,347 A * 3/2000 Abella et al. ................ 704/272

(Continued)

OTHER PUBLICATIONS

Pieraccini et al., "AMICA: The AT&T Mixed Initiative Conversational Architecture", Eurospeech, Sep. 1997.*
Hearst et al., "Mixed-initiative interaction", IEEE Intelligent Systems, Sep./Oct. 1999.*
Horvitz, "Principles of Mixed-Initiative User Interfaces", Conference on Human Factors in Computing Systems, 1999.*

(Continued)

*Primary Examiner*—Patrick N Edouard
*Assistant Examiner*—Eric Yen
(74) *Attorney, Agent, or Firm*—Banner & Witcoff, Ltd.

(57) ABSTRACT

Method for managing mixed-initiative human-machine dialogues based on speech interaction exploiting the separation between general dialogue knowledge, such as communicative acts, which can be used in multiple application domains, and particular linguistic knowledge, which are domain-specific parameters, to process the dialogue as a sequence of changes of status. Each status consist in a set of features linked both to the processed parameters and to the linguistic and pragmatic context, and describes a certain instant of the communicative situation between the user and the system so to discriminate it from other situations that are also only slightly different. The method employs three components. A first component which, given the various parameters of the domain, defines the parameters on which to intervene to modify the status with the intent of converging towards a situation in which all parameters are acquired with a certain value; in parallel, the component identifies the Communicative Act (CA) which applied to these parameters can make the status evolve in the required direction. A second component creates the sentences to be conveyed to user, whereby obtaining a Communicative Act by instancing said parameters. A third component analyses the user's reply to determine the new system status given the parameters that were provided by the user, their mutual coherence, the previous status of these parameters and other correlated parameters.

17 Claims, 4 Drawing Sheets

U.S. PATENT DOCUMENTS

| | | | |
|---|---|---|---|
| 6,173,266 B1 * | 1/2001 | Marx et al. | 704/270 |
| 6,246,981 B1 * | 6/2001 | Papineni et al. | 704/235 |
| 6,356,869 B1 * | 3/2002 | Chapados et al. | 704/275 |
| 6,418,440 B1 * | 7/2002 | Kuo et al. | 707/10 |
| 6,505,162 B1 * | 1/2003 | Wang et al. | 704/275 |
| 6,964,023 B2 * | 11/2005 | Maes et al. | 715/811 |
| 6,983,252 B2 * | 1/2006 | Matheson et al. | 704/275 |
| 7,019,749 B2 * | 3/2006 | Guo et al. | 345/473 |
| 7,024,368 B1 * | 4/2006 | Matheson | 704/275 |
| 7,127,395 B1 * | 10/2006 | Gorin et al. | 704/257 |
| 7,174,297 B2 * | 2/2007 | Guerra et al. | 704/270.1 |
| 7,251,696 B1 * | 7/2007 | Horvitz | 709/228 |

OTHER PUBLICATIONS

Levin et al., "The AT&T-DARPA Communicator Mixed-Initiative Spoken Dialog System", Proceedings of ICSLP, 2000.*

Walker et al., U.S. Appl. No. 60/275,653, filed Mar. 14, 2001.*

Dialogos: A Robust System for Human-Machine Spoken Dialogue . . . A. Albesano et al.(publ.by Cselt, Apr. 1997).

Flexible Mixed Initiative Dialogue . . . by D. Falavigna et al. (publ. by ITC-Irst Dec. 1999).

Some Improvement on the IRST Mixed Initiative . . . by C. Barbero et al. (publ. ITC-Irst Sep. 2000).

A Robust System for Natural Spoken Dialogue by J.F. Allen et al. (publ. by Rochester Univ. Jun. 1996).

Attention, Intentions, and the Structure of Discourse by B.J. Grosz et al. (Computational Linguistics, Jun. 9, 1986).

* cited by examiner

_US 7,499,861 B2_

METHOD FOR MANAGING MIXED INITIATIVE HUMAN-MACHINE DIALOGUES BASED ON INTERACTIVE SPEECH

CROSS REFERENCE TO RELATED APPLICATIONS

This application is the US national phase of PCT application PCT/EP02/11959, filed 25 Oct. 2002, published 8 May 2003 as WO 2003/038809, and claiming the priority of Italian patent application TO2001A001035 itself filed 30 Oct. 2001, whose entire disclosures are herewith incorporated by reference.

FIELD OF THE INVENTION

The invention relates to automatic communication systems between humans and machines, and particularly relates to a method of managing mixed-initiative human-machine dialogues based on speech interaction.

BACKGROUND OF THE INVENTION

The use of information technology by increasingly wide segments of the population imposes strict usability requirements and has created complex application areas, such as, for example, that of providing answers to inaccurate questions or interactively using computer-based education and learning aids. One limit to the extensive use of modern voice synthesis and recognition technology is related to the limit level of naturalness permitted by the interfaces by means of which human users interact with a computer-based system. Reference to software modules for developing interfaces supporting a certain limit degree of initiative by users (starting from a generic voice prompt) are found in the prior art and in patents in the field of human-machine interfaces. Users can interact with current off-the-shelf systems by either answering precise questions or choosing from a set prompted by the system. This type of interaction is not very natural and is disliked by system users.

Furthermore, this type of interaction is not very practicable in application contexts where an explicit model of the user's vision of the service cannot be provided and for which it may consequently be difficult to envisage descriptions of the various linguistic utterances that the user may use to express such a vision. This restriction limits system use, on one hand, and drastically curtails the possible areas in which information technology can be used. Access to data and information by increasingly wide segments of the user population must be based on the availability of natural interfaces, capable of giving the user the necessary freedom of expression to respond in a concise way without needing to necessarily use the utterances prompted by the system. System usability is also entrusted to the user's possibly of correcting information that may not have been understood by the natural language recognition and analysis modules. Furthermore, today's suppliers of automatic information systems need to respond to the needs of clientele who require access to services using their own natural language (we will refer to this requirement as "multilingual").

Some dialogue system prototypes currently available at universities and research centers support this type of interaction but commercial applicability is affected by the need to redefine considerable amounts on information whenever the system is carried across to a new application domain and/or to a new language. This means that the costs of real application can hardly be supported by language industries and potential users.

OBJECTS OF THE INVENTION

We have identified the following requirements for a human-machine dialogue method capable of generating human-machine interfaces allowing natural interaction:
1. independence from application domain;
2. independence from interaction language;
3. adaptability to the user's level of initiative and capability of interacting with natural language recognition and analysis technologies;
4. support of error correction strategy;
5. use of information from other system modules for optimizing interaction with the user;
6. modularity;
7. uniformity;
8. independence from other application components;
9. configurability of degree of initiative and error correction strategies;
10. configurability of linguistic knowledge;
11. compatibility with sector standards;
12. real time operation;
13. development cost sustainability.

Satisfaction of such requirements by a dialogue system would lead to the development of systems capable of interacting naturally.

The aforesaid requirements will be discussed in detail and the method of attaining the requirements will be presented.

1. Independence from Application Domain

Independence of a dialogue system from the application domain means that one dialogue-management system can be used by different applications. Since the linguistic skill of a speaker used to manage verbal interaction is mostly the same, regardless of the topic, we believe that the representation of this general skill can be applied to different discourse domains.

2. Independence from Interaction Language

Independence from language means that a dialogue-management system can be used to implement applications in different languages with the same interaction style, needing only to redefine linguistic knowledge (such as vocabulary, sentences which can be generated following the user's questions and grammar) for each language.

Independence from language and domain means that the human-machine interface method can be rapidly configured to respond to various application needs in multilingual domains.

3. Adaptability to the user's level of initiative and their capability of interacting with natural language recognition and analysis technologies Human-machine interaction systems can be employed by users with various levels of experience in operating speech and automatic linguistic analysis technologies. Various interaction design studies show that humans interface with high technological content systems in very variable ways and that users can adapt to the potentiality of an artificial agent for improving use of the technology.

Furthermore, it is difficult and costly to define such a variegated comprehensive array of user models for services intended for the general public. The current IVR (Interactive Voice Response) systems are consequently rather rigid being modeled on average behavior; this penalizes the initiative capacity of skilled users and makes the system incapable of successfully completing interaction with occasional users. For this reason, human-machine interaction strategies which are independent from explicit user models are required; such strategies must be able to follow the initiative of expert users (e.g. by providing numerous pieces of information in the same sentence) and being capable of assisting inexpert users by employing a more direct interaction style at the same time.

The system must be capable of actuating the passage from one level of initiative to another automatically.

4. Error Correction Strategy Support

The performance of current natural language recognition and analysis systems is imperfect. As a consequence, the services using such systems must implement dialogue management capable of verifying the correctness of acquired information, negotiating the acquisition of missing information with the user and accepting the user's corrections. The current off-the-shelf human-machine interactions systems are not able to manage correction of more than one incorrect piece of information at a time in an adequately natural way. In the case of several errors detected by the user (U) in a single sentence, off-the-shelf systems (S) start very unnatural clarification subdialogues, such as that shown as an example in the following dialogue (1):

Dialogue (1)

| | |
|---|---|
| U: | I want to buy two hundred XYZ at the best order of twenty-one Euros. |
| S: | You want to buy one hundred XYZ shares at the best order of twenty Euros. Is that correct? |
| U: | No |
| S: | Order type: buy. Number of shares: one hundred. Name of shares: XYZ. Price: at the best order of twenty euros. Which piece of information is wrong? |
| U: | Number of shares. |
| S: | Repeat the number of shares you want to buy. |
| U: | Two hundred shares. |
| S: | Two hundred shares. Is that correct? |
| U: | Yes |
| S: | Name of shares: XYZ. Price: at the best order of twenty euros. Which piece of information is wrong? |
| U: | Price. |
| S: | Repeat the price of the shares. |
| U: | At the best order of twenty-one euros. |
| S: | Price. at the best order of twenty-one euros. Is that correct? |
| U: | Yes. |

The user cannot correct by repeating the request, confirming the correct information, etc., if more than one piece of information but not all the information is wrong.

A natural dialogue system, on the other hand, must interact as shown in the following example (2):

Dialogue (2)

| | |
|---|---|
| U: | I want to buy two hundred XYZ at the best order of twenty-one euros. |
| S: | You want to buy one hundred XYZ shares at the best order of twenty euros. Is that correct? |
| U: | No, two hundred XYZ shares at the best order of twenty-one euros. |
| S: | Two hundred XYZ shares at the best order of twenty-one euros? |
| U: | Yes |

The current off-the-shelf dialogue-management systems are based on finite state networks; transactions from one state to another in the network explicitly represent the user's possible corrective actions. It is consequently more cost-effective in terms of interaction design to go from analyzing each piece of information rather than explicitly representing the various information configurations at different degrees of correctness.

5. Use of Information from Other System Modules for Optimizing Interaction with the User Satisfying this requirement implies working on two levels: on one hand, the dialogue-management module must be able to use the information related to value of confidence, possibly communicated by language recognition and analysis modules; on the other hand, it must be able to modify its dialogue strategy according to information related to the domain data to which the system has access. This approach as a whole improves naturalness of the interaction avoiding, for example, useless confirmation requests in the presence of "certainly" acquired information avoiding to elicit information that is useless for the purpose of the interaction. For example, asking for the preferred departure time is meaningless if there is only one departure to the destination chosen by the user that day and it is inappropriate for an automatic booking system to provide the departure time of a fully booked flight.

6. Modularity

Modularity is desirable. This characteristic can be used to exploit the various complex configurations of the dialogue-management system and to manage significant portions of interaction with users in relation to a variety of different tasks. Modularity is also employed to reuse components configured for an application domain in other application domains in which the same information is processed (e.g. dates, timetables, prices, etc.). The reusable dialogue modules and objects offered by today's off-the-shelf systems do not satisfy the aforesaid requirements of naturalness, flexibility and independence from the language and the domain.

7. Uniformity

The dialogue-management components configured for different domains, languages and applications must be used in a uniform fashion (i.e. recallable using the same interface, providing access to results with specified methods) from different applications, regardless of the interaction segment that they are intended to serve and the complexity of the dialogue.

8. Independence from Other Application Components

The dialogue-management module must be independent from the recognition, natural language analysis and voice synthesis resources used to form the application service.

This requirement implies that the communication method between dialogue-management system and the employed external resources is explicitly modeled.

9. Configurability of Degree of Initiative and Error Correction Strategies

Providing that the system must be capable of responding to various levels of user initiative automatically, on the other hand, the level of initiative must be configured by the dialogue-management system user for developing applications. Changing the level of initiative permitted to the user in a predetermined way may be necessary for particular application needs and for focusing the user's attention and the linguistic behavior in critical interaction situations.

10. Configurability of Linguistic Knowledge

The language-dependant and application domain-dependent linguistic knowledge must be definable for each application for the interface performance to respond to linguistic, cultural and domain requirements.

11. Compatibility with Sector Standards

The dialogue-management system must comply with the standards of the sector. For example, in the field of human-machine interface in distributed web environments, the system must respect W3C recommendations and be compatible with emerging standards (VoiceXML at this time).

This characteristic favors reusability of the dialogue-management system by different application developers.

12. Real Time Operation

Systems capable of managing a dialogue between a user and a computerized system are very interesting for the added value they are capable of providing to telephone voice applications and to the development of natural interfaces based on written prompts. The current application scenarios pertain mainly to the world of telephony (e.g. automatic retrieval of information contained in databases, total or partial call center automation, performing natural language requests for voice navigation of web pages, etc.). Interface usability is considerably affected by the time factor: interaction must occur in real time as any conversation between humans.

13. Development Cost Sustainability

Development costs must be sustainable to favor the application of automatic dialogue systems for real public utility services. This implies that the dialogue systems must be designed to favor re-utilization.

Despite being at an early stage of development, the voice technology market is populated by a certain number of off-the-shelf systems designed to manage the interaction between a user and an automatic system utilizing natural language. Providing their very different performance and architectural setup, the currently marketed systems are not capable of satisfying all thirteen requirements listed above. Specifically, most systems fail to satisfy the requirements listed from point 1 to point 5, i.e. independence from the application domain and language and error correction flexibility, permitting an acceptable level of initiative and freedom of expression to the speaker. In particular, the interaction designer must explicit the entire flow of possible interactions between the user and the system to develop applications which permit the naturalness of the interaction exemplified in dialogue (2), according to the traditional voice application development method. This approach is very costly in terms of time needed to develop the application and does not permit reuse in different domains since the general knowledge of the interaction structure must be redefined on a case-by-case basis. The off-the-shelf environments for creating human-machine interaction systems provide predefined dialogue procedures which can be configured by the application developer but which do not provide the conversational functions which are desired by expert users; the level of initiative permitted to the user cannot be compared with that exemplified in (2) and the application designer can only configure a few parameters.

This is because, usually for a specific application, the sentences from the system to the user can be configured but this is not possible neither for vocabularies or grammars used by the recognition system nor for focusing the interaction of progressively less complex sets of information.

The dialogue-management mechanisms based on system plan formulation and user plan recognition presented in literature on dialogue systems in the context of computational linguistics and artificial intelligence are very efficient for creating accurate human-machine interaction models. While being indispensable theoretical tools for describing the operating principles of human-computer dialogues, they cannot be implemented to create real time systems (see Allen, James et al, "A robust system for natural spoken dialogue", in Proceedings of the 34th Annual Meeting of the ACL, Santa Cruz, Calif., Association for Computational Linguistics, Morristown, N.J., 1996). A similar consideration refers to dialogue system prototypes based on the recognition of discourse segment hierarchies (see Grosz, B. J. and Sidner, C. L., "Attention, intentions and the structure of discourse", Computational Linguistics, 12 (3), 1986, 175-204 and Bilange, Eric, "Dialogue Personne-Machine", Paris, Hermes, 1992).

The aforesaid shortcomings and technical problems inherent to the human-machine dialogue system development method described above are overcome and solved by a system which exploits the separation between general dialogue knowledge (usable in various application domains) and particular linguistic knowledge (specific to each domain) permitting mixed initiative by the human and by the system, as described in the preamble to claim 1.

The invention relates to a method of implementing this separation, which is based on the primitive dialogue classification and on the implementation macro-stages described below.

BRIEF DESCRIPTION OF DRAWINGS

Additional characteristics and advantages of the invention will now be described, by the way of example only, with reference to the accompanying drawings describing a preferred embodiment wherein.

BEST MODE FOR CARRYING OUT THE INVENTION

Figure 1:
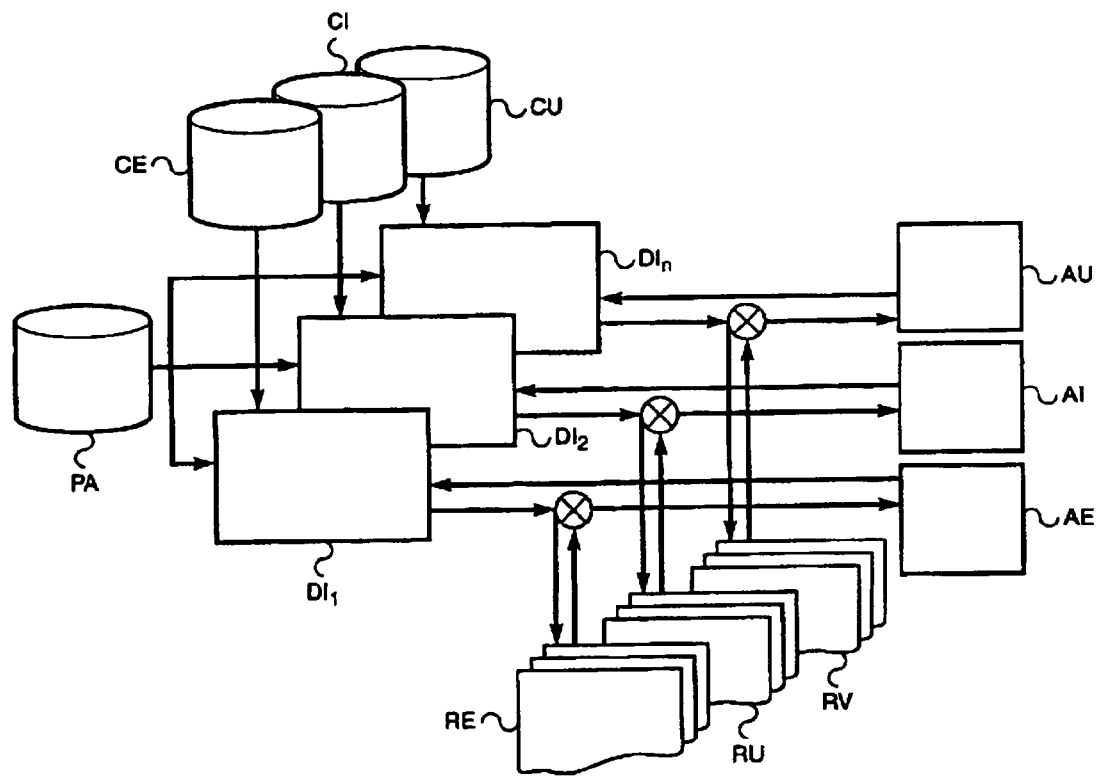
FIG. 1 is a block chart of the management application domain for several natural languages.

In the text that follows, the term "exchange" will refer to the segment of time in which the user utters the values of the parameters forming the request to the system (user's exchange) and in which the system asks for confirmation of the correctness of acquired values or reads the information retrieved in an external database (system exchange).

The dialogue model of the invention realizes a dialogue situation between a user and a machine in which the user provides the domain-specific information elements which form the user's request to the machine and in which the machine uses such elements to satisfy the user's request managing information exchange, confirmation requests and ambiguity solution strategies in general terms. In the method described to this point, the information elements provided by the user are modeled in terms of parameters while the system's exchanges are expressed by communicative acts, or CA in short, which are described in the following table with the respective labels:

| Communicative Act | Description | Example | Applicability condition (parameter status) |
|---|---|---|---|
| CA_INFO | System provides preliminary information on the potentials of the service and the interaction method; introduces the user to the service | "Welcome to the automatic flight information system" | Not associated to specific parameters |

-continued

| Communicative Act | Description | Example | Applicability condition (parameter status) |
|---|---|---|---|
| CA_REQUEST | System requests one or more parameters | "Who would you like to fly with?" | The required parameter status must be "not acquired" (NOT_ACQ). |
| CA_VERIFY | System verifies the value assumed by one or more parameters during the interaction. | "Do you want to fly with Alitalia?" | The verified parameter status must be "acquired" (ACQ). |
| CA_REQUEST_AND_VERIFY | System asks for one or more parameters and verifies the value assumed by one or more parameters during the interaction. | "Arrival in New York. Which airport?" | The required parameters must be NOT_ACQ; the verified parameters must be ACQ. |
| CA_OPEN_OPTION | System proposes an option to continue the interaction leaving the choice of the initiative to the user. | "Do you want information on your return trip?" | All involved parameter status must be "confirmed" (CONF). |
| CA_PHATIC | System generates messages to keep the communication channel open. | "I am looking for connections" Please hold." | No parameters are involved. |
| CA_SELECT | In the case of ambiguous information, system informs the user of the ambiguity and selects the correct value. | "Do you want to arrive at Newark or JFK?" | The involved parameter status must be ACQ. |
| CA_READ | System reads information retrieved in database according to the needs expressed by the user during the interaction | "The first flight in the morning is operated by Swiss Air" | No parameters are involved. |
| CA_CLOSURE | System ends the communication. | "Thank you for your call. Goodbye." | No parameters are involved. |

This list is explicitly defined for making human-machine dialogue interfaces that exploit domain knowledge and dialogue separation characterizing this invention.

The second characterizing aspect of the method herein described is the dialogue processing procedure which is a sequence of parameter status changes, the status being the set of characteristics linked both to the processed parameters and to the linguistic and pragmatic context. The set describes a certain instant of the interaction between the system and the user and is used to discriminate between slightly different situations. Status therefore is not simply a symbol or a number.

In the description of the innovative aspects of the method that follows, we will firstly examine the semantic concepts and the parameters referred to information contained in the user's utterance. This is because while the user's utterance must be interpreted to obtain a possibly formal representation of its meaning, the specific information content must be interpreted and collocated in a context. Unlike other systems, these two activities are classified in the method of this invention according to the different nature, the first of which is linguistic (semantic) and the second is dialogic (contextual).

In the text that follows, the term "parameter" defines an entity which either alone or with an associated value represents a relevant information element for defining the user's needs. An example of parameter is "aircraft_type" with an associated value ("Boeing-747"): this parameter is an information element, e.g. the type of aircraft that the user wants.

We will now examine the classification of the various parameter types.

Basic parameters are simple. A simple parameter conveys a complete atomic piece of information which may correspond to a concept expressed in the user's utterance as it is recognized by a syntactic-semantic analyzer. The parameter is associated with a value, normally consisting of the recognized word (concept significant, in classic linguistics terms). In other cases, the value of the parameter can be a symbolic value (number) instead of a word which in the vocabulary of the application can be considered a word.

Simple parameters support the basic role of content identification of a user's request. Two additional parameter typologies are required to deal with more complex information, namely:

generalized parameters;
structured parameters.

The first generalizes some (at least two) application parameters and are used to process underdetermined information classes or generic concepts (e.g. in a transport application, a generic city could be modeled as a generalized parameter which could later be specified as either the destination city or the departure city). During application parameter definition, the dialogue system designer must explicitly associate various simple parameters to each generalized parameter (the ones that could results from the generalized parameter once the ambiguity has been solved).

A structured parameter is a group of independent parameters which can be simple, e.g. the various parameters that can form a date, a timetable, a departure city (city and station), a date of birth, and so on. The various parameters which constitute a structured parameter can have different roles: some must be present at the same time to instance a structured parameter (e.g. a day of the month and the month) while the others are alternative (a day of the week or a day of the month). In general, despite the fact that they incorporate a great deal of pragmatic knowledge (very different from application to application) and processing is rather complex, structured parameters are essential for any application.

According to the method, the application developer can associate domain specific knowledge to structured parameters to run "check procedures" about correct values of instances of the structured parameter. In other words these procedures include criteria to define whether a set of component parameters with certain associated values can create an instance of the structured parameter or not.

We will now examine other parameter properties which can be exploited in the dialogue interaction project.

The developer may need to define additional knowledge for parameters which are relevant to an application after having identified and defined them. Knowledge associated with parameters can concern relations between different parameters, the level of confidence to be assigned to a parameter to determine whether to ask for confirmation or not, and so on. Parameters can be classified according to their properties in the following way "Certain" parameters are those which do not need to be confirmed after being acquired and can be considered certain either on the basis of knowledge related to the application or on the parameter acquisition mode.

"Offered value" parameters are those for which a standard value can be provided, which can be considered acquired and for which immediate confirmation can be asked on the basis of the knowledge related to the application.

"Associated" parameters are those which can have the same type of value but whose acquired value cannot be the same for the application, e.g. the parameters DEPARTURE_CITY and ARRIVAL_CITY have the same value type (a city) but probably in no application can have the same value ("Torino").

"Delay" parameters are pairs of parameters that the developer decides to delay so that confirmation of the first will only be asked once the second has been acquired instead of following the logic defined by the dialogue module engine.

"Necessary" parameters are those which confirm a father structure: given a structured parameter consisting of "n" component parameters, the dialogue system engine considers the father confirmed when any son is confirmed. This procedure may not be correct for all applications. In this case, the developer may declare which son(s) must be confirmed for the father to be confirmed.

The joint use of the CA set explicitly designed to model the human-machine interface and the parameter classification according to the proposed typology can be exploited to separate dialogue knowledge and application domain knowledge.

We will now examine parameter status management.

Efficiency of the model underlying the method is given by the online non-hierarchic representation of the domain and of the dialogue structure which is referred to in the text that follows in terms of iteration context. Unlike the models based on recognition of planes or segments of discourse, contextual information is represented by "independent single level structures" in this method. There are two types of such structures:

the first, called SGP or "general parameter status", contains in the course of the interaction, for each parameter, a triad formed by the name of the parameter, the value associated with the parameter communicated by the user and the status which is progressively updated;

the second, called CURRENT-SITUATION, contains one of the three values characterizing the specific interaction patterns defined below.

These structures are independent because they are updated on the basis of different content analysis, namely the user's utterance for SGP and the previous utterances for the CURRENT_SITUATION.

The objective of the system is to interact with the user to acquire a value of each parameter needed to access the information required by the user. At the end of each exchange of the interaction, the SGP structure will be updated as far as it concerns the modification of the parameter status determined by the current dialogue exchange. The parameters can have one of the statuses shown in the following table:

| Status | Meaning | Description |
| --- | --- | --- |
| NA | Not affected parameter | The user either has not yet uttered a value for the parameter or the uttered value is not correct. |
| A | Acquired parameter | The user has uttered but not confirmed a value. |
| C | Confirmed parameter | The user has confirmed a parameter value, i.e. the value is associated to a piece of information which was correctly recognized in a correct fashion. |

More in detail:

NA (NOT AFFECTED) means that the parameter has neither been acquired nor confirmed. This is the status of all parameters at the beginning of a dialogue. A parameter can return to this status when a user does not confirm the value of a previously acquired parameter.

A (ACQUIRED) means that the parameter has been acquired and has a value. The value has not been confirmed by the user and for this reason could be incorrect.

C (CONFIRMED) means that the parameter has been confirmed by the user and is assumed that the corresponding value is correct, i.e. that the parameter value has been associated with a positive confidence value attributed during acoustic-phonetic recognition.

Furthermore, the dialogue-management system can be assigned one of the following three transient statuses during input parameter processing, namely:

| Status | Meaning | Description |
| --- | --- | --- |
| UNC | Unchanged parameter value | The value of a previously acquired parameter is re-proposed. |
| NEG | Negated parameter value | The value of parameter contained in an earlier utterance is negated. |
| SUB | Replaced parameter value | The value of a parameter contained in an earlier utterance is replaced. |

The result is a status definition linked to the condition of the various parameters of the application. It responds to the need that the dialogue must evolve from a situation in which all parameters are to be acquired to a situation in which all parameters have been acquired and confirmed.

The dialogue system status according to this method is consequently the Cartesian product of the status of the various simple parameters of the application. However, basing the system exclusively on the status of the various parameters is restrictive: the risk is to start infinite cycles during which certain information is elicited from the user who continues not to provide it (or provides information which is not understood by the system).

Consequently, according to the method, parameter status is completed by other information linked to the number of exchanges which were spent to make a parameter acquire a certain status to ensure programmable recovery exchange starting mechanisms or to take the drastic decision to interrupt the interaction if communication problems exceed certain predetermined levels.

This result can be obtained by using "metalevel variables" which direct the dialogue strategy within certain levels in a certain direction rather than another, particularly in the case of uncertainty.

The dialogue system metalevel, called DML, checks the dialogue strategy employed and is defined by certain features which can be used by the application designer. The starting values of these features, which are applied in the absence of explicit indications by the designer, ensure coherent behavior of the system.

From a general point of view, the DML consists of a finite number of features which define the specific behaviors of how the dialogue is structured but not its general organization. The dialogue is organized as follows:

- the various parameters used by the dialogue system are characterized by an order employed by the system to privilege acquisition or confirmation;
- the system user is free to offer parameters that the system has not elicited also without respecting the order: the system will consider the parameters but will not attempt to confirm them separately regardless of the order;
- the order in which the parameters are acquired and confirmed is that established by the system designer when introducing parameters in the application.

The metalevel offers a certain degree of freedom to dialogue system designers to define the dialogue check strategy. For example, the normal strategy may include the possibility of confirming a parameter and eliciting another one from the user at the same time. This possibility is conditioned by the positive value of an "allow_elicitation_and_initiative" metalevel feature; tagging this feature with a negative value will allow to attempt a variant of the dialogue strategy which would, consequently, acquire one or more parameters and progressively confirm them in the following exchange.

Another aspect of the normal strategy which can be changed by operating on the metalevel concerns dealing with incoherence within a structured parameter. As mentioned above, the strategy can clarify an arising incoherence by instancing an uncertainty link between the involved parameters and instancing a suitable CA_SELECT with these parameters (e.g. "Excuse me, will you be leaving tomorrow or on the sixth of September?"). However, if the system designer decides to proceed by acquiring the incoherent structured parameter again, the specific application of CA_SELECT can be deactivated by operating on the specific metalevel variable ("ML_SELECT_INCONSISTENCY in this case).

The DML variables which can be used by developers are shown in the following table:

| Name of the variable | Behaviour of the involved system | Permitted values |
| --- | --- | --- |
| ML_SELECT = | CA_SELECT is applicable to solve incoherence of a structured parameter (ML_SELECT_INCONSISTENCY) and incoherence between two parameters (ML_SELECT_ALL). | ML_SELECT_INCONSISTENCY (usual value) ML_SELECT_ALL |
| ML_HOLES_ALLOWED = | Defining whether either acquisition of a parameter or set of parameters must be immediately followed by a confirmation request (NO) or the interaction can proceed also without confirming the parameters (YES) | YES NO (usual value) |
| ML_STRUCT_INCONS = | Detected incoherence in a structured parameter is solved either by negotiating the correct value (NEGOTIATE) or eliciting a new value for the parameter (DRASTIC) | DRASTIC NEGOTIATE (usual value) |
| ML_COND_VERIFY = | The choice of a CA_VERIFY for a certain parameter must be postponed until a new parameter specified by the developer (YES) has been acquired. | YES NO (usual value) |
| ML_TASK_REDO = | To rerun the application task (YES). | YES NO (usual value) |
| ML_PARAM_REDO = | To specify which parameters are involved in the rerun. | One or more parameter names |
| ML_DELAY_VERIFY = | To specify the names of the parameter for which confirmation can be delayed. | A list of parameter name pairs separated by a comma and ending with a dot. |
| ML_THRESHOLD_REQ_GEN = | To specify whether a parameter has a threshold (YES) or not (NO) | YES NO (usual value) |
| ML_TASK_LEVEL = | To Specify the type of task: 'single_task' is the usual value; | SINGLE_TASK (usual value) MULTI_TASK |

-continued

| Name of the variable | Behaviour of the involved system | Permitted values |
|---|---|---|
| | 'multi_task' enables the system to work on different levels according to secondary tasks returning application control to the caller at the end of each task; 'menu' enables the system to manage an interaction with choices from a tree menu; 'data_browse' enables selection from a list of data. | MENU DATA_BROWSE |

The system can either work or continue to control the interaction until the end of the dialogue, providing retrieved data or controlling the interaction with the user until a subset of parameters, forming a task, has been acquired according to the value of the DML "ML_MULTI_TASK" variable.

The structure intended to contain the informative contents of single tasks which can form a domain is called 8general task status", herein called SGT. The objective of the system is to interact with the user to acquire a value for each parameter needed to access the information elicited by the user for the task specified by the calling application. The active task can assume the following values while the task is running:

| Value | Meaning | Description |
|---|---|---|
| PENDING | Not active task | This is the status of all tasks at the beginning of each interaction |
| RUNNING | Task in progress | The task is running. |
| EXECUTED | Completed task | The task was completed successfully. |
| FAILED | Failed task | The task failed because not all parameters of the task have been acquired. |
| RUNNING_DEFAULT | Normal task in progress | The dialogue system was not recalled by a specific task and the normal task comprising all parameters of the domain is in progress. |

This completes a description of the fundamental elements of the method. We will now describe the general objective of the algorithms which can be used to implement the method. According to the method, the dialogue-management system consists of three main components:

1. Given the various parameters of the domain, a first component defines the parameter (or parameters) on which to intervene to modify the status with the intent of converging towards a situation in which all parameters are acquired and confirmed; in parallel, the component identifies the CA which applied to these parameters can make the status evolve in the required direction;

2. A second component for creating the sentences to be conveyed to user; the CA is obtained by instancing this parameters.

3. A third component which analyses the user's answer to determine the new system status given the parameters which were provided by the user, their mutual coherence (considering that incoherence more often depends on recognition than on lack of co-operation of the user), the previous status of these parameters and other correlated parameters and so on.

We will now describe the algorithms which can be used to classify the aforesaid knowledge (CA, parameters, etc.) for implementing a computerized dialogue-management system.

In addition to these three components, method application includes the realization of a module for processing domain related knowledge. The knowledge must be made available to the three general dialogue components listed above. The three dialogue components will therefore be equipped with the set of structures for storing linguist knowledge described below. More in particular, the linguistic knowledge stored in the module that we are about to described is sorted according to the aforesaid classifications (parameters, communicative acts and metalevel variables) and may also concern the "check procedures" previously described in relation to structured parameters.

The steps to be following for initially selecting knowledge according to the method are illustrated below:

1. The parameter names selected; the parameter names will be used to classify information provided by the user (e.g. in a travel information domain, the departure and arrival city, the date of departure, etc.) and to place the information in one of the aforesaid categories (e.g. simple parameters, such as "departure city" or structured parameters; certain, negated or associated value parameters).

2. Procedures are associated with non-simple parameters (e.g. check procedures on the validity of a set of values referred to a single structured parameter).

3. The following information is classified according to the given CA categories: the parameters involved in the CA, the sentences to be used to request, confirm, etc., these parameters, the number of times that the CA can be uttered, the utterance contexts of the phrase. "Utterance context" is the situation in which incomprehension between user and system may have occurred or not. Such situations may be reconnected to three typical cases, in which in CA are labeled STANDARD in normal contexts, NOT_UND, in the case of user and system incomprehension, NO_CONT, in the case of a context in which the sentence cannot be used to continue the interaction, respectively. The following CA is provided as an example:

CA_REQUEST
C DEP C ARR
Please tell me your departure and arrival city.
FLAG_C=STANDARD
THRESHOLD=2

The first line contains the CA label, the second the set of parameters whose status must be NOT_ACQUIRED at the time of utterance, the third is the sentence to be read to the user, the fourth label specifies the utterance context, the fifth the number of times in which the sentence can be repeated to the user in a single dialogue.

A second example:
CA_VERIFY
C DEP C ARR @ C DEP C ARR
Do you want to travel from ~ to ~?
FLAG_C=STANDARD
THRESHOLD=2

Note that for this CA, the method specifies both the parameters to be verified (i.e. those whose status is ACQUIRED) at the time of utterance (symbolized here as a non-limiting example by @) and the values which can be used as fillers in the place of the diacritics in the sentence shown in the third line.

The fourth and the fifth lines are omitted in the third example below:
CA_SELECT
W_DAY DAY @ W_DAY DAY
Are you leaving from ~ or ~? Also in this case, the prompted parameters are both those to be acquired at the time of utterance and those to be used for generation.

4. The metalevel variables are stated; they must be compatible with the permitted variable name and value pairs specified in the table above. Finally, application developers must have the possibility of defining both the names of acts addressed to external dialogue resources (e.g. to access databases) and their associated procedures, and the names of involved parameters that the dialogue-management system can recall at the suitable time.

5. The possible parameter subsets are isolated; the subsets are those intended as specific domain tasks and a name is assigned, e.g.:
TASK1=C DEP C ARR The specific linguistic knowledge of the application must be stored in structures designed to exploit knowledge interdependence. Specifically, the following structures are provided:
- a structure intended to contain the application parameters in a tidy fashion (Param);
- a structure for storing the names of the check procedures possibly associated with each parameter (ParamProc);
- a structure for storing the possible tasks (Task);
- a structure intended to contain CA and associated information (CommAct);
- a structure containing the names of the acts to be performed with reference to external act (ExtAct);
- a structure containing the names of the-parameters possibly associated with each act (ActDB);
- a generic structure for storing possible DML options (Sdml);
- a structure for storing the formal representation of the sentence uttered by the user of each exchange of the dialogue (DeepSemDialogue).

Specific software will extract the knowledge in the selected format and make it available to the general dialogue algorithms which will be described below and storing them in the structures listed above. In this way, the general algorithms will not have to be made considering specific applications, parameter names, particular phrases, etc. and can be used to manage different applications and different languages within a common architecture, as shown in FIG. 1.

This figure shows how the proposed method can be used to manage any one application domain for several natural languages (Italian, English and Spanish, in this example) starting from a single common domain knowledge configuration. The parameters, contained in PA, will be declared once only for all three languages while the metalevel knowledge DML and the Communicative Acts CA, contained in CUTTING INSERT, CU and CE, must be necessarily specified for the various languages. A knowledge compilation mechanism based on separately declared domains creates of the various instances from a single dialogue-management system core. The figure shows the flow of information between the various dialogue manager instances DI1, . . . , DIN, and the other typical components of a natural language dialogue application. Particularly, the arrows leading from the Italian, English and Spanish applications (AI, AU and AE, respectively) to the manager instances (DI1, . . . , DIN) create requests and information of various nature for the system, e.g. managing the user's telephone call, information retrieved in the database and the recognition results. Furthermore, the arrows leading from the manager instances to an application cross an area which is accessed by the Italian, English and Spanish recognition systems RE, RU and RE. This schematic representation illustrates the selection activity by the manager core of the suitable recognition methods given the current context of the application.

Following specific knowledge compilation, the dialogue is managed by applying a main algorithm and a number of complementary algorithms for managing multiple confirmations, solving cases of ambiguity, error and misunderstanding, choosing dialogue acts and customizing dialogues in different application domains.

The following dialogue-management algorithm can be implemented to exploit the idea contained in this invention.

Figure 2:
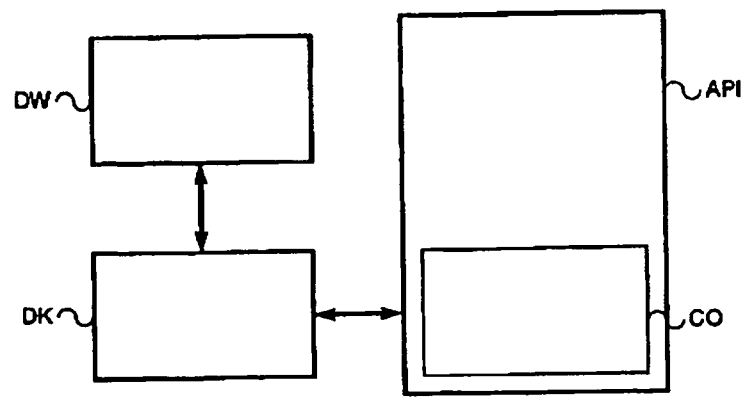
FIG. 2 is a block chart of an application instance of the method.

The dialogue-management activity can be interpreted as a process which is activated upon reception of an external request which can essentially be of two types, namely a "user request" or an "application requests shown in FIG. 2.

The chart illustrates an application instance of the described method. The domain knowledge DW (specific for each natural language) is shown in the top left. The knowledge compiled by a knowledge compiler DK, and made available to the dialogue manager core (CO), initializes the data structures on which the dialogue algorithms described above operate. The dialogue manager core can be recalled by means of the API primitives of the integration level by an external application call. Having received a request, the dialogue module starts an interpreting activity, provides a result and waits to be reactivated by an external request.

Figure 3:
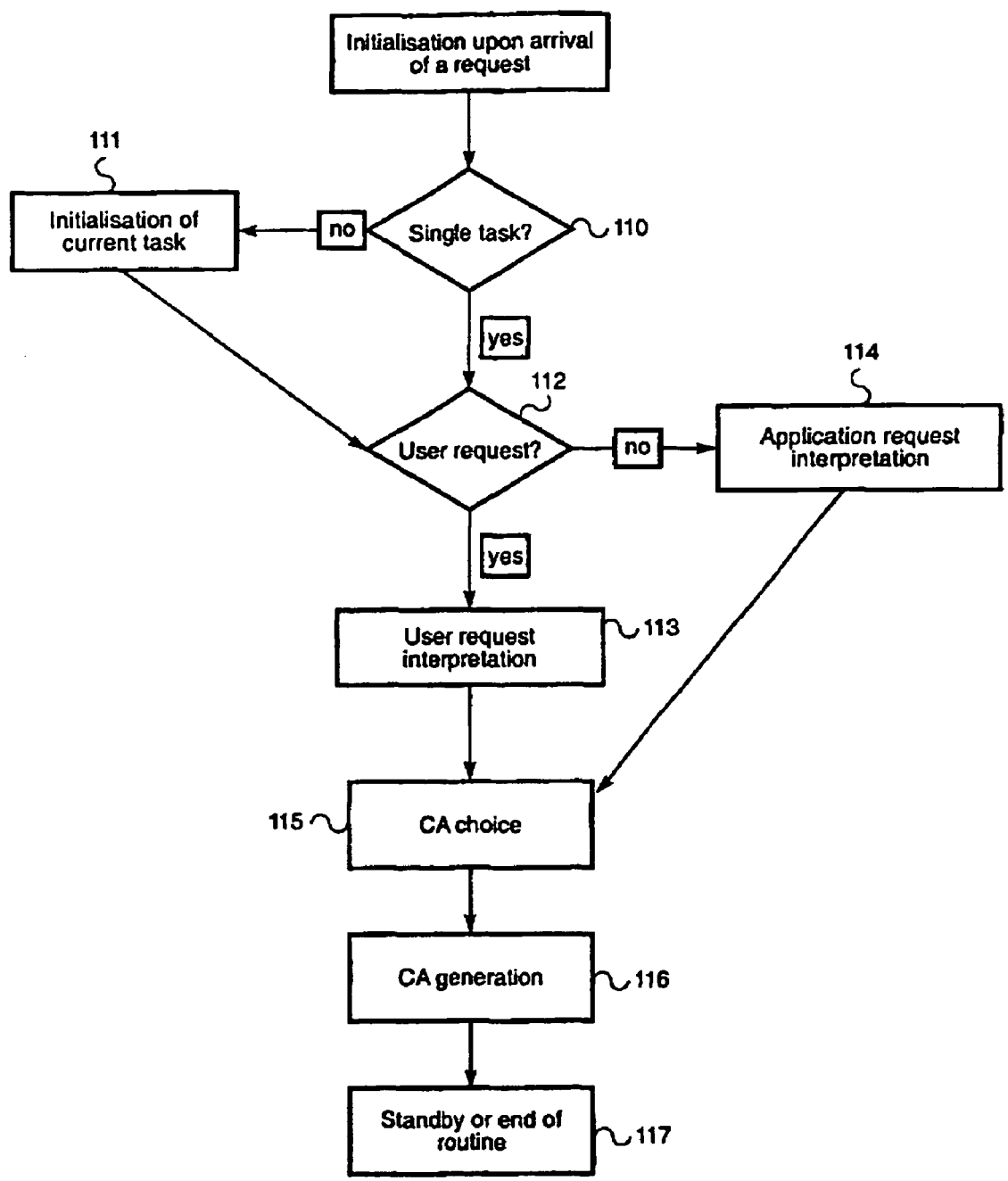
FIG. 3 is a flow chart describing the fundamental stages of the dialogue-management algorithm.

The fundamental steps of the dialogue-management algorithm, illustrated in the flow chart in FIG. 3, are:

1. Activation upon reception of a request: domain task initialization by verifying whether the compiled application knowledge requires the management of a single task (step 110) or several tasks. In the latter case, the system initializes the parameter subset forming the current task (step 111).

2. Request classification (step 112): this can come either from the user (step 113) or from the application (step 114). Step 113 interprets the user's request according to the context determined by the latest realized CA, the parameters contained in the user's request and the current parameter status and task status. Step 114 interprets the request of the application according to the latest realized CA and the contents of the information from the application.

3. Choice of CA to be generated according to the context determined by the application parameter status and task status (step 115).

4. Generation of instanced CA by selecting a CA configuration whose applicability threshold is not saturated (step 116).

5. Standby or end of routine (step 117).

We will now examine each step individually.

Management of step 110 consists in checking the value of the DML variable "ML-MULTI-TASK". The method goes to step 112 immediately in the case of SINGLE-TASK management; the general structure of SGT tasks is initialized and the value PENDING is assigned to the specified status (step 111) if MULTI-TASK is active.

Step 112 consists in discriminating whether the dialogue module request consists of a sentence uttered by the user (i.e. by the sentence interpretation result generated by a syntactic-semantic analyzer) or by a message sent by other application modules.

Figure 4:
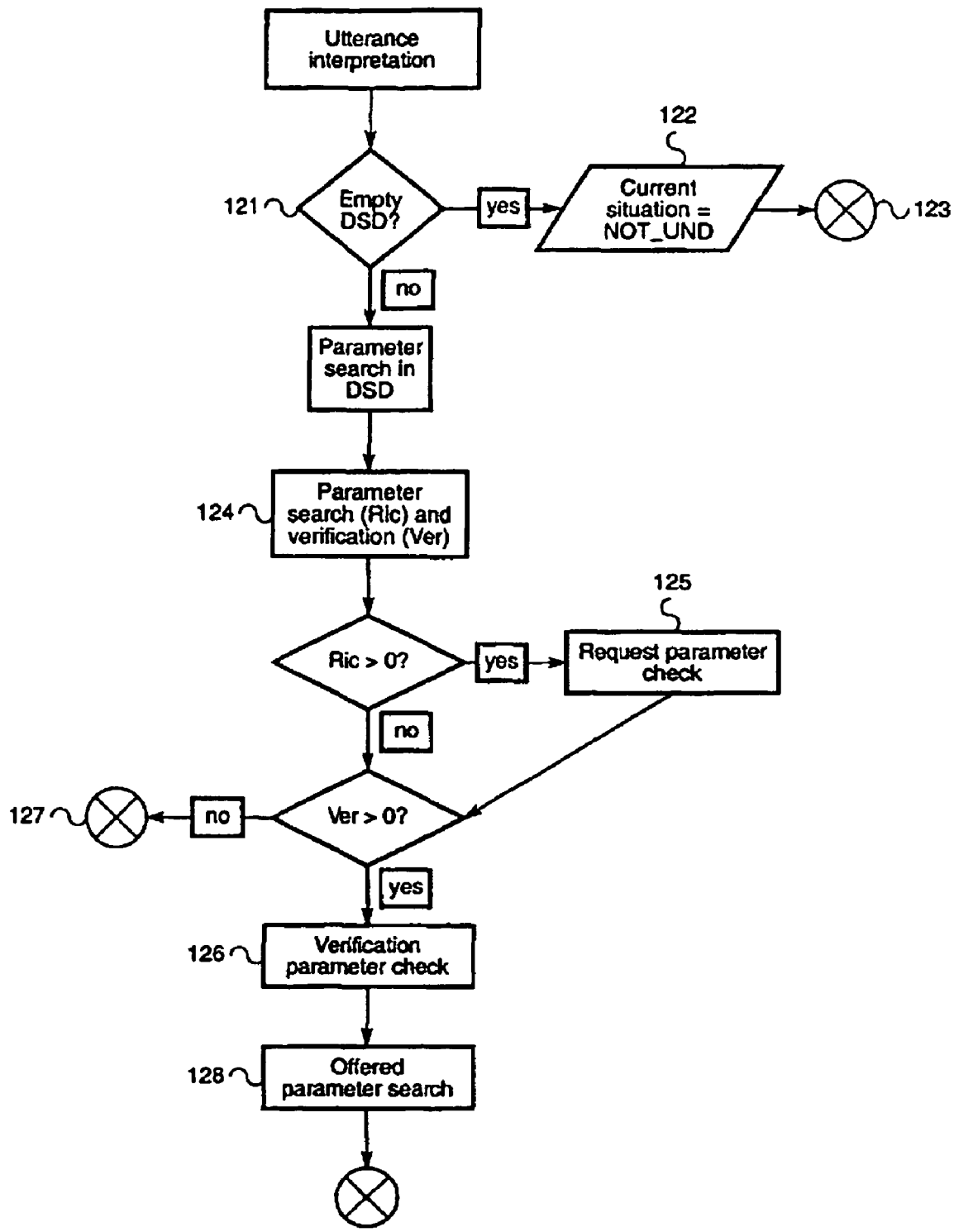
FIG. 4 is a flow chart describing the fundamental stages of the user's utterance interpretation algorithm.

Step 113 consists of running the main algorithm for interpreting the user's request and managing confirmation and uncertainty. The user's sentence interpretation shown in the flow chart of FIG. 4, starts by analyzing the sentence saved in the "DeepSemDialog" structure, hereof called DSD for short.

In addition to DSD contents, request interpretation considered the instanced CA of the previous exchange and the involved parameters which were the object of the request and/or the verification.

A contextual variable CURRENT_SITUATION with value NOT_UND (step 122) is initialized and the user's sentence interpretation (step 123) is ended either if the DSD is empty (step 121), if the user has not spoken or because the previous analysis phases have failed. There must be correspondence between the values attributed to the CURRENT_SITUATION variable and those used to identify the CA utterance context.

The following checks are conducted if the DSD is not empty, starting from the current CA of each parameter being either requested (step 125) and/or verified (step 126):

The concerned parameter is sought for in the DSD (step 124); if present, its value is analyzed with respect to possible SGP value and status; if none of the concerned parameters are present, the DSD content is declared useless, either by attributing the value NO_CONT to the CURRENT-SITUATION variable at the end of the interpretation step (step 127) or by processing the offered parameters.

The compatibility of the concerned parameter is checked against the values of the other associated parameters in the SGP; the interpretation will continue if the check is positive; the concerned parameters status will be deemed uncertain, which will be solved by activating a specific CA SELECT if the result is negative.

The structured parameter coherence of the concerned parameter will be checked if the parameter is the component of a structured parameter by applying the functions defined by the application developer to verify whether the component values can coexist; interpretation will continue if the check result is positive; the concerned parameters status will be deemed uncertain, which will be solved either by activating a specific CA SELECT or by acquiring a new parameter according to the choices made by the application developer to define system metalevel if the result is negative.

The status and the value of the concerned SGP parameter are modified if required.

Having completed the checks above for the parameters to be requested or verified, the parameters offered by the user are sought for in the DSD (step 128). The following checks are carried out for each parameter which is offered but not required The compatibility of the offered parameter is checked against the value offered by the other parameters to which it is associated in the SGP; interpretation will continue if the check result is positive to acquire the parameter; if the result is negative, the offer will be rejected if it is incompatible with the previously confirmed associated parameters; otherwise the concerned parameter status is deemed uncertain.

The structured parameter coherence of the concerned parameter will be checked if the parameter is a component of a structured parameter by applying the functions defined by the application developer to verify whether the component values can coexist; interpretation will continue if the check result is positive; the parameter is rejected if the result is negative.

The status and the value of the concerned SGP parameter are modified if required.

Step 114 in FIG. 3 consists in analyzing the system message to discover the source and content to be run where required and run initialization actions of data structures and variables inside the dialogue module. Message types can be:

NEW CALL

END CALL

DATABASE MESSAGE;

SYSTEM ERROR.

Figure 5:
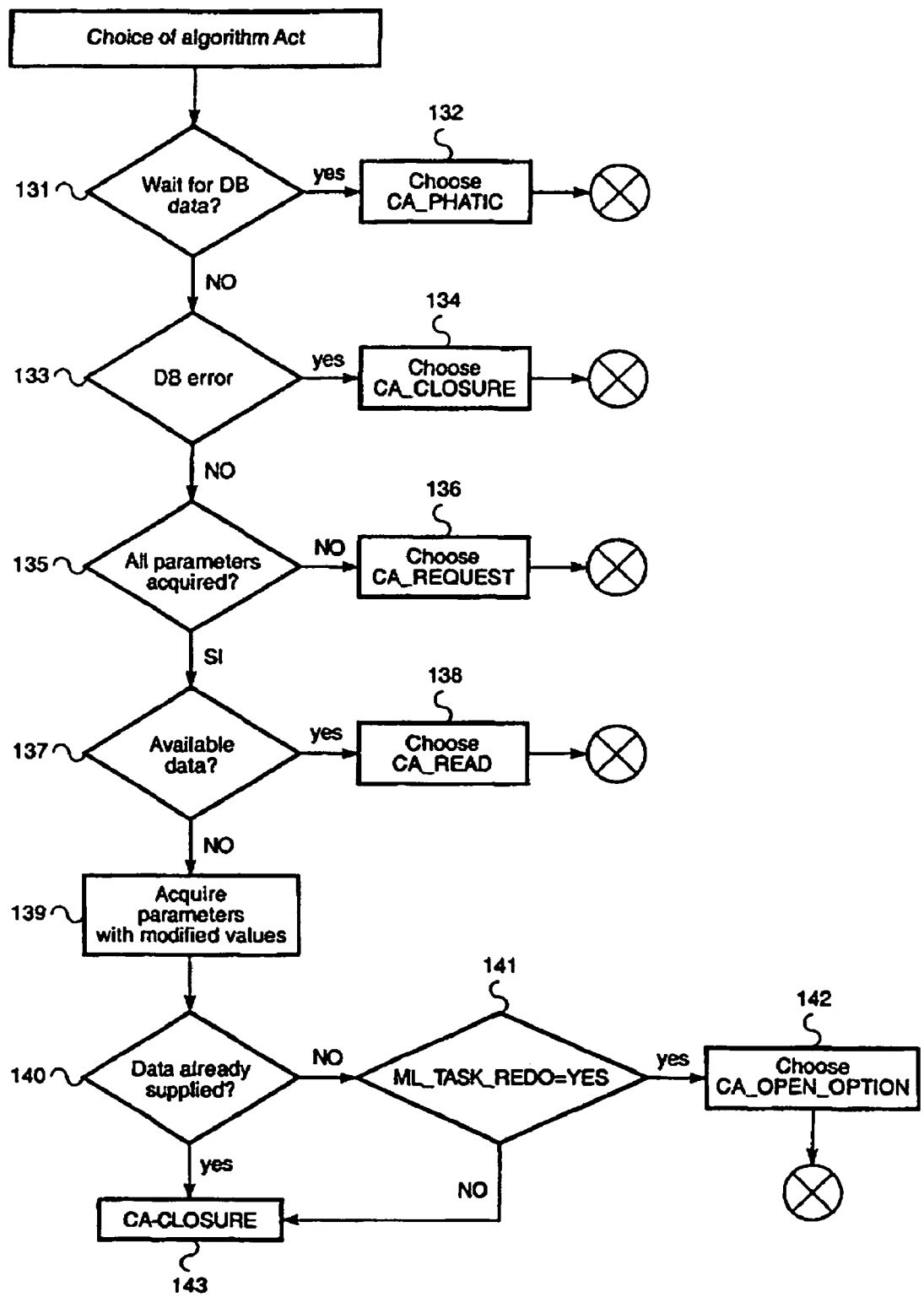
FIG. 5 is a flow chart describing the fundamental stages of the algorithm for selecting the communicative act to be generated.

The algorithm for selecting the CA to be generated is run in step 115 in FIG. 3 (illustrated in detail in the flow chart in FIG. 5). The choice of the new CA which permits continuation of the dialogue interaction consists of two fundamental activities.

First, the application-specific resources are checked (e.g. a database, herein called DB) for information pertinent to the interaction in progress with the user.

This obviously affects the CA choice.

The interaction with the DB must account for the following events

The user is put on standby and CA_PHATIC is selected (step 132) when waiting for an answer from the DB following a request that blocks the interaction with the user (step 131).

The interaction is closed and CA CLOSURE is selected (step 134) if an interaction error with the DB occurred (step 133).

The availability of data satisfying the request is verified if all parameters required for the current application task have been acquired (step 135); otherwise the system returns to the parameter acquisition algorithm by selecting a CA REQUEST (step 136).

The interaction proceeds by reading the data (step 138) if the data has been retrieved from the DB (step 137).

If the DB does not contain data for the current request, the system checks whether either a new request for reacquiring one or more parameters has been run or access to external resources has been made on the basis of pre-defined values (step 139).

The system checks whether the knowledge compiled for the current application include task rerunning by checking the value attributed to MLTASKREDO (pass 141); if affirmative, CA_OPEN_OPTION is selected and the user is prompted to repeat the task (step 142); if negative, the algorithm selects CA_CLOSURE to end the interaction (step 143).

During parameter acquisition, for selecting which CA to generate the system considers the following the current SGP status the parameter acquisition order (declared by the application developer during parameter declaration).

The algorithm identifies the parameter or parameters in which the SGP status is other than CONFIRMED and consequently identifies the type (or types) of CA which can be applied to a certain parameter, compatibly with the current status of the parameter. The most suitable CA is sought starting from the set of possible CA types. This research is made on the basis of the CA set planned by the application developer. The first CA which satisfies the requirements determined by the application threshold value and by the context determined by the immediately previous interaction exchange is selected.

The CA is generated in step 116 of FIG. 3. As mentioned, a CA to be applied to a certain set of parameters must always been identified given a certain system status. Obviously, specific knowledge (which will be described below) must exist for the selection to be made.

The generation mechanism requires that the CA instanced on a certain number of parameters is associated with a sentence possibly containing markers which must be replaced with one of the sentence segments (other single words, simple specific parameter values). For example, a sentence such as "Do you want to travel from ~ to ~?" can be associated with a VERIFY CA operating on two parameters DEPARTURE_CITY and ARRIVALCITY. The values of the two parameters contained in the SGP will be analyzed during generation and will replace the markers. The resulting sentence will be "Do you want to travel from Turin to Milan?".

As concerns processing the user's answers to a CA_VERIFY, the method includes a mechanism for solving ambiguities deriving from underdetermined confirmation.

Implementation of this mechanism is necessary when two or more parameters p1 and p2 are to be confirmed and the user replies "No" or "Non correct", etc. without adding additional corrective information. According to the method, an uncertainty link, devoted to correct the information and avoid redundant confirmation exchanges, is established between the parameters if confirmation or correction is not possible in a single dialog turn. This means that the values acquired for the linked parameters cannot be all confirmed at the same time either because one or more of such values are the result of a recognition error or incorrect user input. The following example illustrates the procedure applied when the verification procedure concerns the values acquired for two parameters.

Four possible truth combinations (correct/incorrect) are possible with two involved parameters (e.g. p1 and p2) only one of which can be assumed as incoherent (not plausible), i.e. that in which both parameter values are correct. The other three are plausible, i.e. the one in which both are incorrect and the one in which only one parameter is incorrect. To solve the uncertainty link, the method consists in realizing three interaction modalities with the user which correspond to an equal number of system behaviors. These modalities can be selected as required by the dialog application developer by attributing the appropriate values to the ML_SELECT and ML_STRUCT-INCONS metalevel variables.

A first interaction mode consists in selecting a CA_VERIFY applied to parameter p1 alone. The parameter value is updated to DENIED if the user does not confirm the value of p1. The status of the parameter in the SGP structure is changed either to NOT-AFFECTED or to ACQUIRED, according to whether an alternative value was supplied or not. Otherwise, p2 in SGP will be deleted if the user confirms p1 and a new request will be issued by selecting a CA_REQUEST. If two parameters are being verified, confirmation of the last one will not be required when the user has confirmed all the first parameter (employing as many dialog turns as needed). This type of interaction is obtained by assigning the value NEGOTIATE to the ML-STRUCT-INCONS variable.

A second interaction mode consists in rejecting the values of the parameters being verified beforehand and asking the user to repeat the values, possibly one at a time, i.e. passing to an interaction mode which is more closely guided by the system. This mode is used to focus the interaction on certain information typologies and consequently reduce the risk of ambiguity. This interaction mode is obtained by assigning the value DRASTIC to the MLSTRUCTINCONS metalevel variable.

The third interaction mode consists in solving ambiguity by means of CA_SELECT generation hypothesizing (until the contrary is proven) that only one of the parameters is wrong and asking the user to select either possibility. The user can be prompted to either repeat the previously uttered sentence, correct the incorrect part or repeat the correct part only. The method assigns CONFIRMED status to both parameters if the user confirms. These will be used to update the SGP parameter values and attribute ACQUIRED status if alternatives are provided for both parameters. According to the method, the parameter not confirmed will be deleted in the SGP, and a new acquisition will be carried out. The latter communicative mode is obtained by enabling the use of CA_SELECT to select ambiguity in the dialogue, by attributing the value ML_SELECT_ALL to the metalevel variable ML_SELECT.

More than one CA can be generated at a time during an interaction with a user according to the indications of the application developer. These indications take shape in the declaration of a numeric value (applicability threshold) associated with the concerned CA declaration. The system must asks for each parameter if the required parameter set cannot be acquired during to recognition errors or lack of co-operation on behalf of the user.

It is supposed that the application designer will plan this behavior for the DATE and TIME parameter pair. To ensure that the system works in this way, the designer must declare a CA_REQUEST applied to the DATE and TIME parameters with applicability threshold equal to 1. For example, this means that in the application with the system may generate the sentence "What day and time do you want to leave?" only once. The system will not attempt to acquire both parameters in a single exchange if it determines that neither has been acquired. The system will generate a first sentence in which it asks, for example, for the date (using the CA planned by the designer). After acquiring the date, the system will proceed by asking for confirmation and will then acquire the time by selecting another CA.

Finally (step 117 in FIG. 3), the method either stands by or ends the procedure.

Naturally, numerous changes can be implemented to the construction and embodiments of the invention herein envisaged without departing from the scope of the present invention, as defined by the following claims.

The invention claimed is:

1. A method of managing mixed-initiative human-machine dialogues based on speech interaction for providing a service to a human user in a particular context or domain in which sentences uttered by the user are modeled in terms of parameters that are simple or structured informative elements while the exchanges of the machine are expressed by means of communicative acts, the method comprising the steps of:

processing the dialogue as a sequence of changes of parameter status that is a set of characteristics of the parameters dependent on the linguistic and pragmatic context, this set describing a certain instant of the communicative situation between the user and the machine;

selecting from the parameters of the domain, the parameters on which to intervene to modify the status with the intent of converging towards a situation in which all the selected parameters are acquired and confirmed;

identifying in parallel the communicative act that applied to the selected parameters makes the status evolve toward completion of the dialogue;

creating sentences to be conveyed to the user as a communicative act applied to the selected parameters; and analyzing the user's reply to determine a new status for the machine parameters, checking for mutual coherence among the simple or structured informative elements, their previous status, the status of parameters, and the value of the parameters provided by the user, activating a dialogue system by the reception of an external request that can come from the user or from the application and which performs the following operations:

activation upon reception of a request: domain task initialization by verifying whether the application knowledge requires the management of a single task or several tasks; in the latter case, the system initializes the parameter subset forming the current task;

request classification: interpreting a user's request according to the context determined by the latest realized communicative acts, the parameters contained in the user's request and the current parameter status and task status;

choice of a communicative act to be generated according to the context determined by the application parameter status and task status;

generation of instanced communicative act by selecting a configuration whose applicability threshold is not saturated;

standby or end of routine, the structure of the dialogue being represented by a general parameter status used to store parameter information, values associated with the parameters, and the status that is progressively updated for each parameter during the dialogue;

interpreting a user's sentence by:
  considering the contents of said structure of the dialogue, the communicative act issued to a user during the previous exchange and the involved parameters;
  if said structure is empty, initializing a contextual variable with a first value and interpreting the user's sentence ends;
  if said structure is not empty, running the following checks starting from a selection of at least one communicative act applied to at least one parameter that is either requested and/or verified;

checking with the system if the at least one parameter is represented in the structure of the dialogue; if it is represented, its value is analyzed with respect to the dialogue status represented in the general parameter status; if the at least one parameter is present, the content of structure of the dialogue is considered useless as it pertains to the parameter by attributing the value NOCONT to the CURRENT_SITUATION variable at the end of the interpretation step, if more than one parameter is present in the structure of the dialogue, each one is processed for the at least one parameter;

checking the compatibility of the at least one parameter against the value of the at least one other associated parameter represented in the structure of the dialogue; the interpretation will continue if the check is positive, otherwise the status of the at least one parameter and its associated parameter are deemed uncertain and such event will cause the selection of a communicative act CA_SELECT;

if the at least one parameter is part of a structured parameter, the coherence of the structured parameter will be checked on the basis of information represented by the at least one parameter: interpretation will continue if the check result is positive, otherwise the concerned parameters status will be deemed uncertain, which will be solved either by activating a specific communicative act CA_SELECT or by acquiring a new parameter;

updating the status of the concerned parameter in the structure of the dialogue;

if a user's sentence expresses at least one offered parameter that was not requested by the machine, the non-requested parameter is included in the structure and the following checks are run:
  the compatibility of the offered parameter is checked against the value of at least one associated parameter;
  interpretation will continue if the check result is positive and the offered parameter is represented in the structure of the dialogue, otherwise the offered parameter is rejected.

2. The method according to claim 1 wherein a set of two or more communicative acts selected from the following are employed to realize human-machine dialogue interfaces which exploit separation between domain and dialogue knowledge:

CA_INFO: the machine provides preliminary information to introduce the user to the service;

CA_REQUEST: the machine requests one or more parameters;

CA_VERIFY: the machine verifies the value assumed by one or more parameters during the interaction;

CA_REQUEST_AND_VERIFY: the machine asks for one or more parameters and verifies the value assumed by one or more parameters during the interaction;

CA_OPEN_OPTION: the machine proposes to continue the interaction and the user can choose to continue or quit;

CA_PHATIC: the machine generates messages to keep the communication channel open;

CA_SELECT: in the case of ambiguous information, the machine informs the user of the ambiguity and selects the correct value;

CA_READ: the machine reads information retrieved in database according to the needs expressed by the user during the interaction;

CA_CLOSURE: the machine ends the communication.

3. The method according to claim 1 wherein said parameters include simple parameters that convey a complete, atomic piece of information corresponding to a concept expressed in a user's utterance to which values consisting either of recognized words or symbolic values are associated.

4. The method according to claim 3 wherein said parameters include generalized parameters that provide a generalization of two or more parameters and that are used to process underdetermined pieces of information corresponding to a concept expressed in a user's utterance.

5. The method according to claim 4 wherein said parameters include structured parameters consisting of sets of simple parameters that may be either simultaneously or exclusively present.

6. The method according to claim 5 wherein specific domain knowledge is associated with said structured parameters to run check procedures on the value acquired during the dialogue.

7. The method according to claim 1 wherein said parameters are defined as follows according to their properties:
"certain" parameters are those which do not need to be confirmed after being acquired and can be considered certain either on the basis of knowledge;
"offered value" parameters are those for which a standard value can be provided, which can be considered acquired, and for which immediate confirmation can be asked on the basis of the knowledge related to the application;
"associated" parameters are those that can have the same type of value but whose acquired value cannot be the same for the application;
"delay" parameters are pairs of parameters that the developer decides to delay so that confirmation of the first will only be asked once the second has been acquired; "necessary" parameters are those which confirm a structured parameter consisting of "n" parameters.

8. The method according to claim 1 wherein the current situation of at least one parameter is augmented by information about the number of exchanges spent to make a parameter reach a status of not-affected, acquired, or confirmed.

9. The method according to claim 8 wherein information about the current situation of the parameters is augmented by information represented by metalevel variables whose values give rise to the following different behavior of the machine:
if a metalevel variable ML_SELECT_INCONSISTENCY is on, the machine selects CA_SELECT communicative act to solve incoherence of a structured parameter;
if a metalevel variable ML_SELECT_ALL is on, the machine selects a CA_SELECT communicative act to solve incoherence between two parameters;
if the value specified for ML_STRUCT_INCONS metalevel variable is NEGOTIATE, an incoherence detected in a structured parameter is solved by prompting the user for a correct value;
if the value specified for ML_STRUCT_INCONS metalevel variable is DRASTIC, an incoherence detected in a structured parameter is solved by again asking the parameter value of the user;
if the value of the metalevel variable ML_COND_VERIFY is YES, the choice of a CA_VERIFY for a certain parameter must be postponed until a predetermined new parameter has been asked of the user;
if the value of the metalevel variable ML_TASK_REDO is YES, the dialogue task is rerun and, if the value is NO, the dialogue task cannot be rerun;
the ML_DELAY_VERIFY metalevel variable is valued with the list of names of the parameters whose confirmations can be delayed.

10. The method according to claim 1 wherein a structure representing the status of different tasks is realized that is one of the following:
nonactive task labeled as "pending,
task in progress labeled as "running" or "running default,"
task completed with success labeled as "executed, or
task completed with failure labeled (failed).

11. The method according to claim 1, further comprising the step of
processing the domain-specific knowledge comprising a set of structures for storing linguistic knowledge ordered according to parameters, communicative acts and metalevel variables for processing check procedures related to said structured parameters.

12. The method according to claim 1, an initial choice of the knowledge is made by the following steps:
selecting the parameters names that will be used to classify information provided by the user and to categorize the information;
associating procedures with non-simple parameters;
classifying the following information according to the given communicative-act categories:
the parameters involved in the communicative act,
the sentences to be used to request, confirm, etc., said parameters,
the number of times that the communicative act can be uttered, and
the utterance contexts of the sentence;
stating the metalevel variables and the names of the acts addressed to external dialogue resources and associating them with procedures, where required, and names of the involved parameters;
isolating the parameter subsets intended as specific domain tasks and assigning respective names thereto.

13. The method according to claim 1 wherein application-specific linguistic knowledge is stored in the following structures:
a structure for the parameter names;
a structure for names of the check procedures associated with each parameter;
a structure for tasks;
a structure for communicative acts and associated information
a structure for the names of the acts to be performed with reference to software modules that do not pertain to the dialogue system;
a structure for the names of the parameters associated with each act;
a structure for the formal representation of the sentence uttered by the user of each exchange of the dialogue containing the concepts expressed in the user sentence represented as a set of argument-value pairs.

14. The method according to claim 1 wherein the value of the metalevel variable specifying the task type is checked during the first operation: the system immediately goes to request classification in the case of SINGLE-TASK; in the case of multiple tasks, the general task structure is initialized and a non active status is assigned to the specified step.

15. The method according to claim 1 wherein the following steps are carried out during the second operation:
the machine discriminates whether the dialogue module consists of a sentence uttered by the user or consists of a message sent by other system modules;
the main algorithm for interpreting the user's request and managing confirmation and uncertainty is run;
the system message is analyzed to discover the source and the contents and to run internal variable initialization actions.

16. The method according to claim 1 wherein the following operations are performed to select the communicative act to be generated:
resources external to the dialogue system are checked for information pertinent to the interaction in progress with the user; the user is put on standby and CA_PHATIC is selected when waiting for an answer from said resources following a request that blocks the interaction with the user;
the interaction is closed and a CA_CLOSURE is selected if an interaction error with said resources occurred;
the availability of information data satisfying the request is verified if all parameters required for the current application task have been acquired; otherwise the system returns to the parameter acquisition algorithm by selecting a communicative act CA_REQUEST;
the interaction proceeds by reading the information data if the information has been retrieved from said resources;

if said resources do not contain information data for a current request, the system checks whether either a new request for reacquiring one or more parameters has been run or access to external resources has been made on the basis of predefined values;

the system checks whether the knowledge compiled for the current application include task rerunning by checking the value attributed to ML_TASK_REDO; if affirmative, a communication act CA_OPEN_OPTION is selected and the user is prompted to rerun the task; if negative, the algorithm selects a communication act CA_CLOSURE to end the interaction.

17. The method according to claim 1 wherein, if the user responds without providing informative elements useful for confirming two or more parameters, one of the following three modes is applied to solve cases of underdetermined communication:

a communication act CA_VERIFY applied to a first parameter is selected; if the user does not confirm the value of the first parameter the parameter value in the structure of the dialogue is updated to DENIED and its status is represented either as ACQUIRED or NOT_AFFECTED, according to whether an alternative value was supplied or not;

if the user confirms the first parameter, a second parameter in the structure of the dialogue is deleted and a new request is issued to the user by selecting a communicative act CA_REQUEST;

if more than two parameters are being verified, confirmation of the last parameter will not be required once the user has confirmed all previous parameters;

the values of the parameters being verified are rejected beforehand and the user is asked to repeat the values one at a time;

it is hypothesized that only one of the parameters is wrong and the user is asked to choice one of two alternative values; a CA_SELECT is generated and:

CONFIRMED status is assigned to both parameters if the previous sentence is confirmed, the value of the parameters in the structure of the dialogue is changed and status ACQUIRED is assigned if alternative values are provided for both parameters, if only one parameter is confirmed, the nonconfirmed parameter is deleted from the structure of the dialogue and a new parameter acquisition is started.

* * * * *